United States Patent [19]

Frykhult

[11] Patent Number: 5,330,646
[45] Date of Patent: Jul. 19, 1994

[54] APPARATUS FOR FILTERING LIQUIDS
[75] Inventor: Rune Frykhult, Stockholm, Sweden
[73] Assignee: Ingenjorsfirman R. Frykhult AB, Stockholm, Sweden
[21] Appl. No.: 861,984
[22] PCT Filed: Feb. 18, 1991
[86] PCT No.: PCT/SE91/00112
§ 371 Date: Jun. 30, 1992
§ 102(e) Date: Jun. 30, 1992
[87] PCT Pub. No.: WO91/12065
PCT Pub. Date: Aug. 22, 1991

[30] Foreign Application Priority Data

Feb. 16, 1990 [SE] Sweden .............................. 9000569-5
Feb. 16, 1990 [SE] Sweden .............................. 9000571-1

[51] Int. Cl.$^5$ ............................................. B01D 33/21
[52] U.S. Cl. ................................. 210/331; 210/327; 210/347
[58] Field of Search ............... 210/327, 331, 330, 345, 210/346, 347, 359, 402, 403, 404

[56] References Cited

U.S. PATENT DOCUMENTS 4,123,363 10/1978 Koskinen .
4,255,264 3/1981 Madsen .
4,330,405 5/1982 Davis et al. .
4,728,424 3/1988 Miura ................................... 210/331
4,814,093 3/1989 Frykhult ............................ 210/780

FOREIGN PATENT DOCUMENTS 433571 6/1984 Sweden .
2178973 2/1987 United Kingdom .

Primary Examiner—Robert A. Dawson
Assistant Examiner—David Reitsnyder
Attorney, Agent, or Firm—Mason, Fenwick & Lawrence

[57] ABSTRACT

An apparatus for filtering liquids, especially for recovering fibers from white water, includes rotatable filter discs at least partially immersed in the liquid to be filtered, and a shaft wall connected to the discs forming a circular cylindrical filtrate chamber, which extends centrally through the discs. A rigid stationary partition wall extends in the filtrate chamber dividing the latter into at least two axial channels. The partition wall is spaced from the shaft wall and arranged such that all of said axial channels receive various fractions of filtrate, respectively. Filtrate discharge means is provided for discharging said fractions of filtrate respectively from the respective axial channels, such that the pressure prevailing in the filtrate of each channel is at least substantially as high as atmospheric pressure.

8 Claims, 3 Drawing Sheets

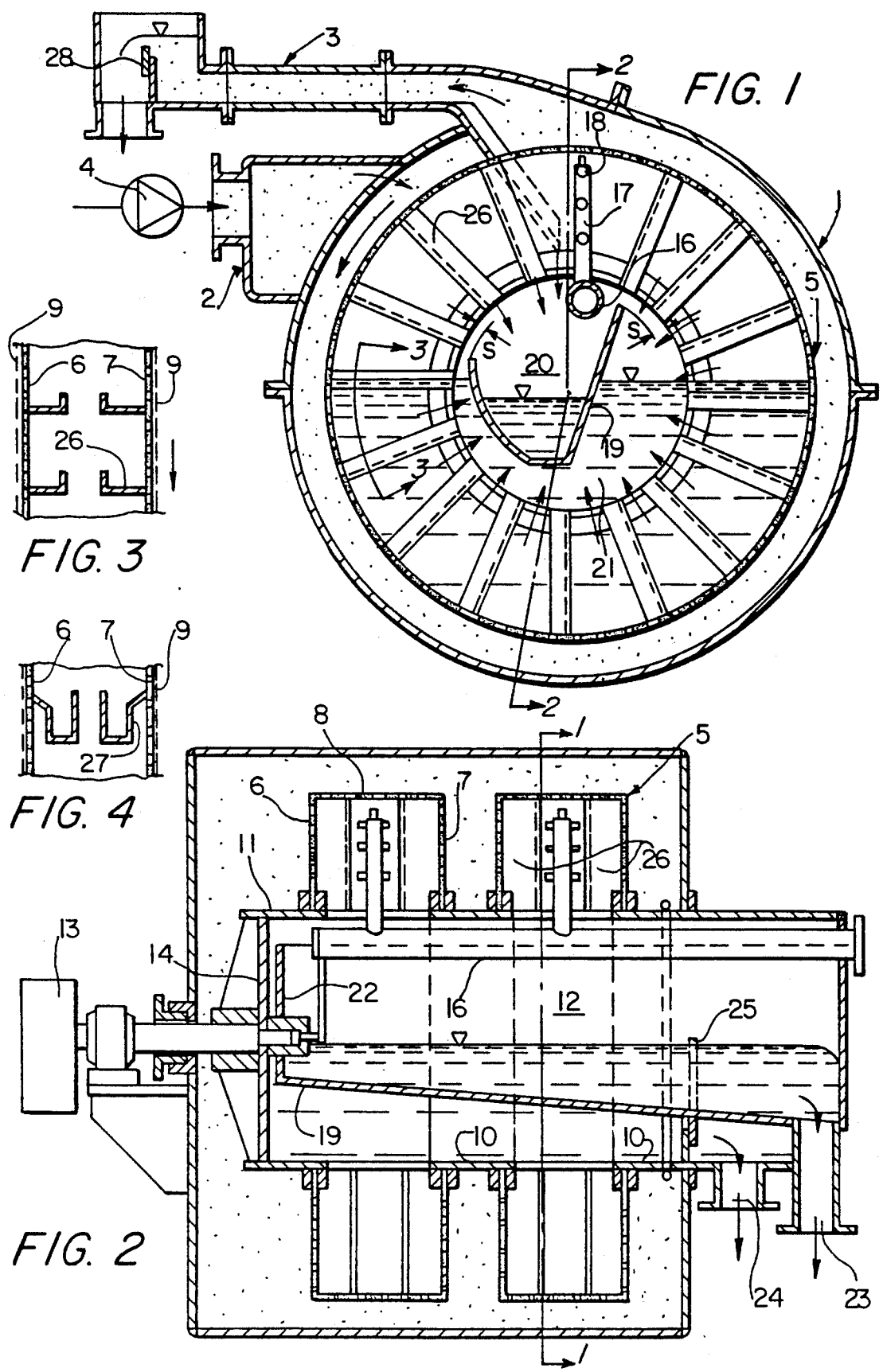

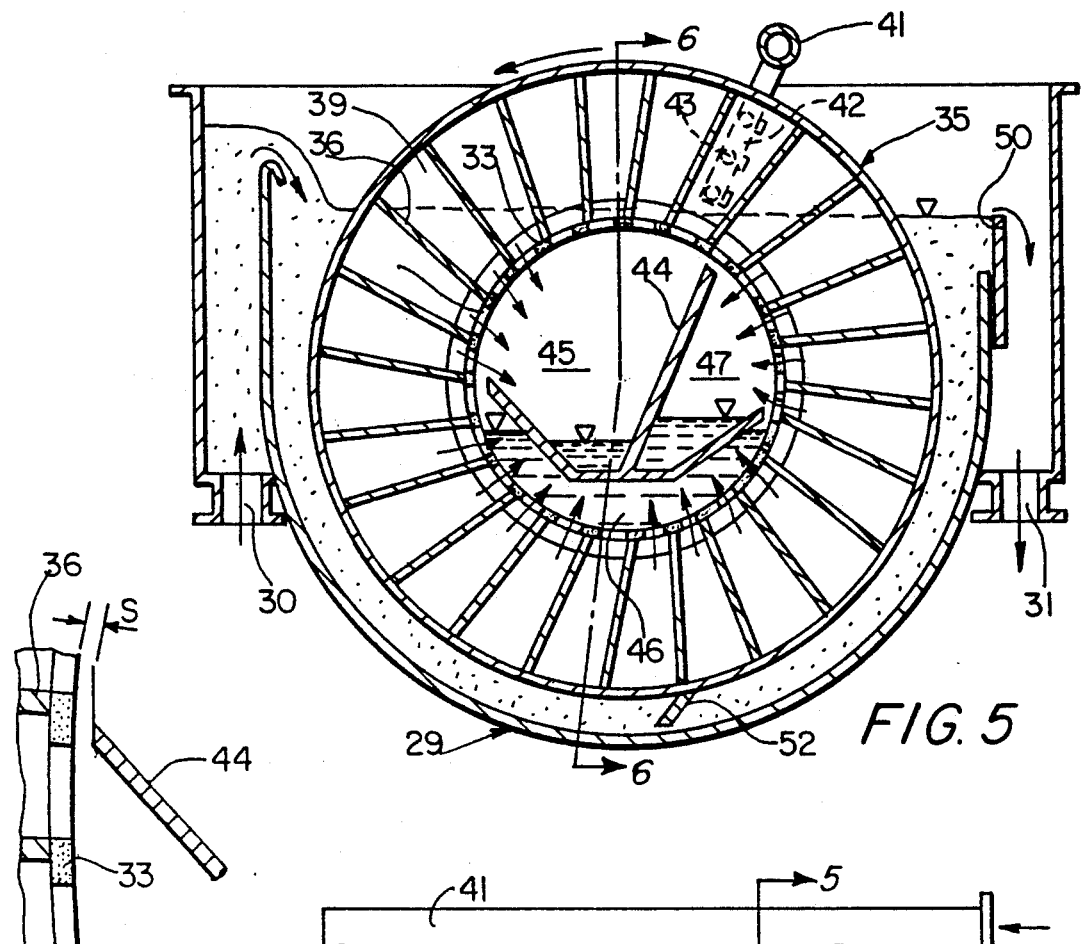
FIG. 5
FIG. 7
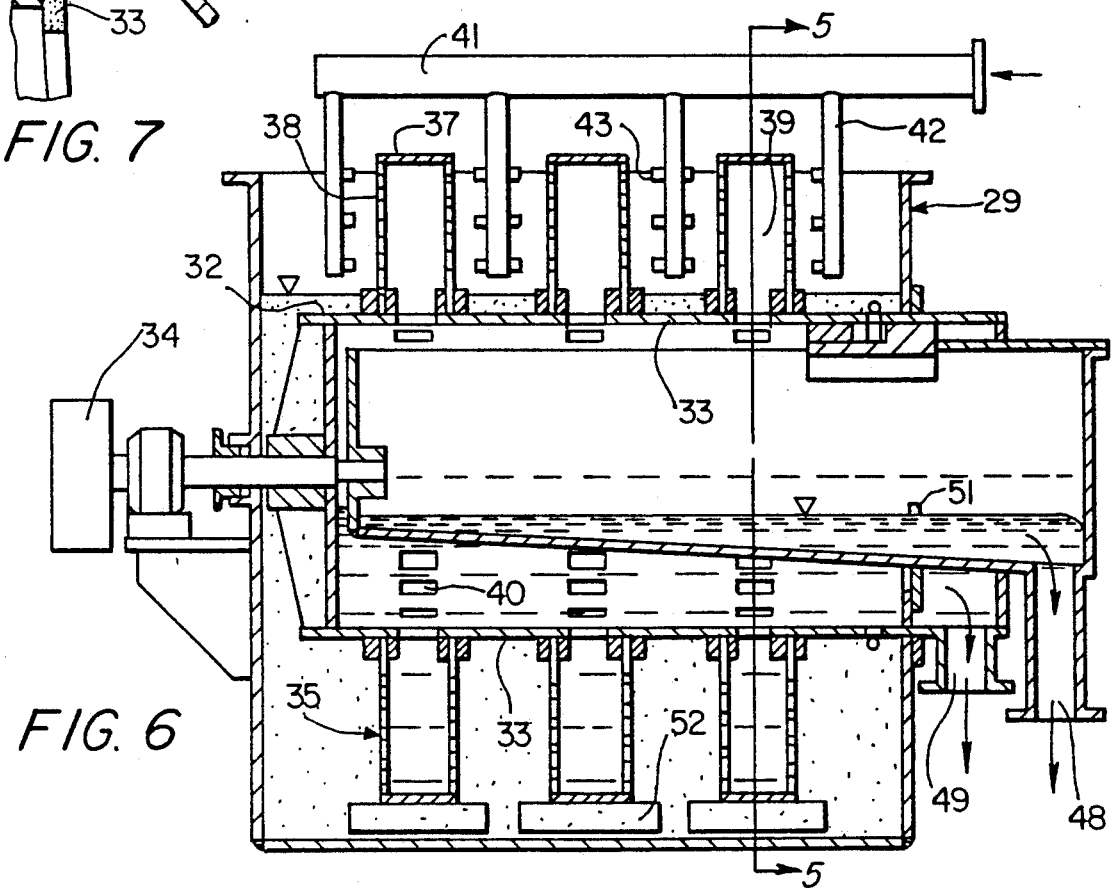
FIG. 6

5,330,646

APPARATUS FOR FILTERING LIQUIDS

BACKGROUND OF THE INVENTION

1. Field of the Invention

The present invention relates to an apparatus for filtering liquids, especially for recovering fibres from so-called white water produced in the paper making industry.

2. Description of the Prior Art

A common type of filtering apparatuses for filtering liquids comprises at least one annular hollow filter disc with side walls covered with filter material adapted to be at least partly immersed in a body of liquid to be filtered and arranged substantially transverse to a horizontal axis extending centrally through the filter disc. There is means for rotating the annular hollow disc about said horizontal axis. Shaft wall means is connected to the filter disc and forms a circular cylindrical chamber, which extends centrally through the hollow filter disc coaxial with said axis and which communicates with the interior of the hollow filter disc. There is means for creating a pressure difference between said body of liquid to be filtered and the interior of the hollow filter disc, such that a filtrate of the liquid is forced through the filter material into the hollow filter disc and passed therefrom into said cylindrical chamber. Filtrate discharge means is provided for discharging said filtrate from the cylindrical chamber, and spray nozzle means is provided for cleaning the filter material.

This type of filtering apparatus is of a simple and inexpensive design. However, a drawback to this apparatus is the poor purity of the filtrate when filtering fibre pulp suspensions, which makes the apparatus unsuitable for fibre recovery. As the filter disc is rotated in a body of white water containing fibres, a relatively large flow of cloudy filtrate is passed through the filter material just after the latter has been cleaned by the spray nozzle means. During the further rotation of the filter material, a mat of fibres is built up on the filter material. This mat of fibres constitutes in itself a tight filter medium, with the result that a relatively small flow of clear filtrate is passed through the part of the filter material which is covered with such a mat of fibres. However, said large flow of cloudy filtrate and said small flow of clear filtrate are mixed in the cylindrical chamber resulting in a poor purity of the filtrate leaving the filtering apparatus.

Another type of filtering apparatus known as "vacuum filtering apparatus" includes filter discs with circumferentially spaced filtrate chambers, which are connected to axial filtrate discharge pipes. During rotation of the filter discs, the filtrate discharge pipes are connected in sequence to two droplegs, with the result that the filtrate is divided into a cloudy filtrate and a clear filtrate. However, if a great number of filter discs is used, such as twenty discs, the rotational speed of the filter discs must be low, in order to prevent too much mixing of the cloudy and clear filtrates. This is so because cloudy filtrate created in the filter discs farthest from the droplegs takes some time to flow through the axial discharge pipes to the droplegs. During this time, the filter discs are rotated a bit further, with the result that the cloudy filtrate from said discs farthest from the droplegs is mixed with clear filtrate from the discs close to the droplegs. Thus, when using such a vacuum filtering apparatus for cleaning white water from fibres, the operational capacity of the apparatus is low because of the necessity to keep an extremely low rotational speed.

In addition, a vacuum filtering apparatus is very expensive compared to the type of filtering apparatus which is operated without such droplegs.

U.S. Pat. No. 4,123,363 discloses a vacuum filtering apparatus, in which the above-described axial filtrate discharge pipes are replaced by two axial filtrate discharge channels, which are formed by a stationary partition wall extending axially through a hollow shaft, on which the filter discs are mounted. The two filtrate discharge channels are connected to two droplegs, respectively. There is also a third axial channel, which communicates with the atmosphere via the upper parts of the filter discs, whereby mats of fibres created on the filter material can be removed from said upper parts of the filter discs by means of liquid jets. During rotation of the filter discs, cloudy filtrate is discharged through the first filtrate channel and clear filtrate is discharged through the second filtrate channel, as seen in the rotational direction of the filter discs. In this manner, cloudy and clear filtrate cannot be mixed, independently of the rotational speed of the filter discs.

A problem with this known vacuum filtering apparatus of U.s. Pat. No. 4,123,363 is that communication has to be prevented between said third channel, in which atmospheric pressure prevails, and said two filtrate discharge channels, in which normally negative pressures of about 4 MWG (meter water gauge) prevail, in order to maintain the subpressures in the latter. This requires air-tight seals between the stationary partition wall and the rotating hollow shaft. To obtain acceptable air-tight seals, the clearance between the partition wall and the hollow shaft should not exceed 0.1 mm. However, in practice it would be almost impossible, at least within reasonable costs, to provide such a small clearance along the entire length of the hollow shaft. In ordinary vacuum filter apparatuses, the length of the shaft which carries the filter discs can be up to seven meters. Even if the sealing requirements could be fulfilled, the seals would be worn down in a short time by clumps of small fibres jammed between the partition wall and the hollow shaft.

As to the knowledge of the inventor of the present invention, the apparatus according to U.S. Pat. No. 4,123,363 has not been commercialized, presumably because of the above-related sealing problem.

SUMMARY OF THE INVENTION

A primary object of the present invention is to provide a filtering apparatus, which is well suited for producing a particularly clear filtrate, or even a so-called ultraclear filtrate, especially in connection with the recovery of fibres from white water.

A secondary object of the present invention is to provide a simple and inexpensive filtering apparatus for producing clear filtrate.

These objects are fulfilled by means of an apparatus for filtering liquids, such as fibre pulp suspensions, comprising:

at least one annular hollow filter disc with side walls covered with filter material adapted to be at least partly immersed in a body of a liquid to be filtered and arranged substantially transverse to a horizontal axis extending centrally through the filter disc, means for rotating the annular hollow disc about the horizontal axis, shaft wall means connected to the filter disc and forming a circular cylindrical chamber, which extends centrally through the hollow filter disc coaxially with the axis and which communicates with the interior of the hollow filter disc, means for creating a pressure difference between the body of liquid to be filtered and the interior of the hollow filter disc, such that a filtrate of the liquid is forced through the filter material into the hollow filter disc and passed therefrom into the cylindrical chamber, spray nozzle means for cleaning the filter material;

rigid stationary partition wall means extending axially in the cylindrical chamber and dividing the latter into at least two axial channels, which are partly defined by the shaft wall means, the partition wall means being radially spaced from the shaft wall means and arranged, such that all of the axial channels receive various fractions of filtrate, respectively, during operation, and filtrate discharge means adapted to discharge the fractions of filtrate separately from the respective axial channels, such that the pressure prevailing in the filtrate of each channel is at least substantially as high as atmospheric pressure.

Since all of the axial channels are utilized for receiving fractions of filtrate, respectively, and there are no substantial differences between the pressures prevailing in the channels, there is no need for providing tight seals between the stationary partition wall means and the rotating shaft wall means. Thus, the partition wall means can be radially spaced from the shaft wall means, such that the clearance between them is of the size of centimeters. This has the positive consequence that expensive machining of the radially inner surface of the shaft wall means is eliminated and fine particles in the filtrate, such as clumps of fibres, cannot be jammed between the rigid partition wall means and the rotating shaft wall means, as compared to the vacuum filtering apparatus of U.S. Pat. No. 4,123,363.

Leakage between adjacent axial channels can be prevented by providing a filtrate discharge means adapted to maintain the axial channels at least partly filled with air.

As an alternative, a minor leakage of filtrate between adjacent axial channels may be accepted, provided that the leakage takes place from a purer filtrate fraction to a less pure filtrate fraction, since a minor leakage normally is insignificant in practice. A filtrate leakage from a purer filtrate fraction to a less pure filtrate fraction means that the flow direction of the leakage always is directed backward in relationship to the direction of rotation of the filter discs. To achieve this flow direction of the filtrate leakage, pressure control means can be provided to keep the pressure in the purer filtrate fraction somewhat higher than that of the less pure filtrate fraction, where communication between said filtrate fractions takes place.

Suitably, said pressure control means may be constituted by overflow members.

In a preferred embodiment of the apparatus of the invention, the hollow disc is provided with a plurality of guide members extending between the side walls and positioned so as to divide the interior of the filter disc into a number of filtrate chambers disposed in series around the filter disc. The filtrate chambers communicate with the cylindrical chamber via outlets, respectively, formed by the shaft wall means. The filter disc is arranged in a container for the liquid to be filtered. Means is provided for controlling the volume of the liquid in the container, such that the side walls are partly above the liquid in the container. The filtrate discharge means comprises means for maintaining a pool of filtrate in at least one of the axial channels. The guide members are arranged, such that each filtrate chamber is at least partly above said pool of filtrate at some point of the revolution of the filter disc at the up-moving part of the filter disc, while the outlet of the filtrate chamber opens into said pool of filtrate.

Each filtrate chamber functions as a dropleg as the filtrate chamber moves upward during rotation of the filter disc, and when at least a part of the chamber is above said pool of filtrate, while the outlet of the filtrate chamber opens into said pool. As a result, a negative pressure is created in the filtrate chamber, because of the liquid lock formed between the filtrate chamber and said pool. Thus, the pressure difference between the outside and the inside of the filtrate chamber at said point of revolution of the filter disc is increased by the created negative pressure in the chamber, and consequently, the flow of filtrate through the filter material is increased. Also, a more compressed mat of course particles, such as fibres, is formed on the filter material, because of said increased pressure difference, with the result that the fibre concentration of the course fraction is increased.

The guide members are preferably arranged, such that each filtrate chamber is at least partly above the liquid in the container at some point of the revolution of the filter disc at the up-moving part of the filter disc, while the outlet of the filtrate chamber opens into said pool of filtrate. This means the unique advantage that filtrate is sucked from the mat of fibres above the liquid in the container, which increases the fibre concentration of the course fraction. In fact, a fibre concentration of up to 9% is possible to obtain, a result which previously has been reserved for the conventional expensive type of vacuum filtering appartus, which is equipped with straight droplegs of normally seven meters height.

DESCRIPTION OF THE DRAWINGS

FIG. 1 is a vertical cross-section of an embodiment of the filtering apparatus of the invention, FIG. 2 is a sectional view taken along line II—II of FIG. 1, FIG. 3 is a part of a section taken along line III—III of FIG. 1, FIG. 4 is a modification of the embodiment shown in FIG. 3, FIG. 5 is a vertical cross-section of another embodiment of the filtering apparatus of the invention, FIG. 6 is a sectional view taken along line VI—VI of FIG. 5, FIG. 7 is an enlarged detail of the embodiment shown in FIG. 5.

DETAILED DESCRIPTION OF THE INVENTION

Figure 8:
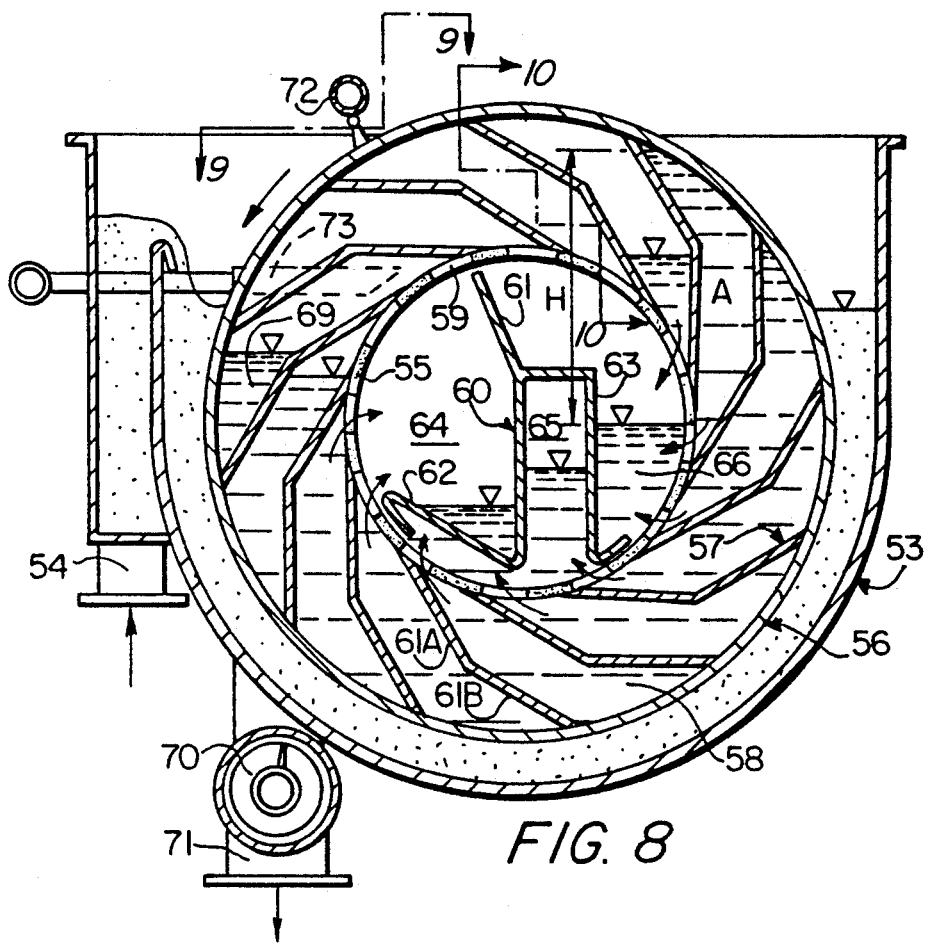
FIG. 8 is a vertical cross-section of a preferred embodiment of the filtering apparatus of the invention.
Figure 9:
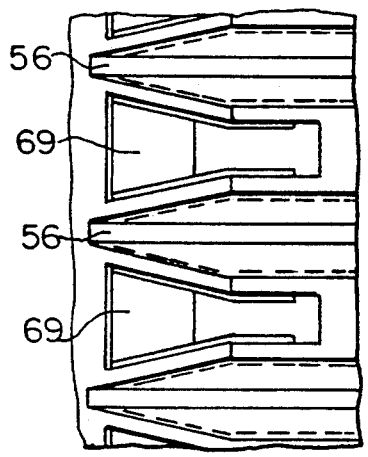
FIG. 9 is a part of a view from above along line IX—IX of FIG. 8.
Figure 10:
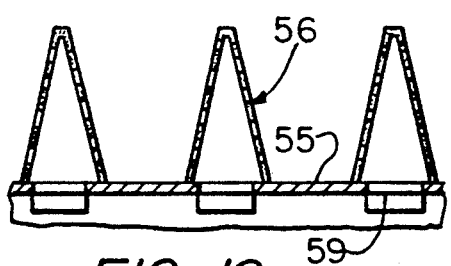
FIG. 10 is a part of a sectional view along line X—X of FIG. 8.

The filtering apparatus shown in FIGS. 1 to 3 comprises a housing 1 with an inlet member 2 for the liquid to be filtered, and an outlet member 3 at top of the housing 1 for discharging filtered liquid, i.e. created course fraction. A pump 4 is provided to pump the liquid to be filtered into the interior of the housing 1 via the inlet member 2. In the housing 1 there are two annular hollow filter discs 5 spaced from each other and arranged transverse to a horizontal axis, which extends centrally through the filter discs 5. Each filter disc 5 comprises two opposed side walls 6, 7 having radially inner and outer circular ends. The side walls 6, 7 of each filter disc 5 are attached to each other at their outer ends via a peripheral wall 8. The walls 6 to 8 are made pervious by liquid and are covered with a suitable filter material 9, such as cloth, felt, net or thin perforated plate.

The radially inner ends of the filter discs 5 are sealingly attached to circular cylindrical wall portions 10, which form a hollow shaft 11, the interior of which constitutes a filtrate chamber 12 for receiving a filtrate. The hollow shaft 11 is journalled on the housing 1. A drive motor 13 is engaged with a gable wall 14 at one end of the hollow shaft 11 for rotating the shaft 11. Opposite the gable wall 14, the hollow shaft 11 has an open gable end, at which one of the cylindrical wall portions 10 is sealingly journalled on the housing 1.

A stationary pipe 16 for cleansing fluid extends in the upper part of the filtrate chamber 12 and is journalled on the gable wall 14. From the pipe 16 two radial branch pipes 17 extend upward into the two hollow discs 5, respectively. Each branch pipe 17 is provided with a number of spray nozzles 18.

A stationary rigid partition wall 19 extends axially in the filtrate chamber 12 and divides the latter into two axial filtrate channels 20 and 21, which are partly defined by the cylindrical wall portions 10. The partition wall 19 has the shape of a trough with two upper wall edges, which are spaced a distance S from the cylindrical wall portions 10 and located at ten o'clock and one o'clock positions, respectively, in relationship to the filter discs 5, as seen in FIG. 1.

The axial filtrate channel 20 is partly defined by the shorter circumferential parts of the cylindrical wall portions 10 which extend between the upper wall edges of the portion wall 19, whereas the axial channel 21 is partly defined by the longer circumferential parts of the cylindrical wall portions 10 which extend between said upper wall edges.

A gable portion 22 of the trough-shaped partition wall 19 is journalled on the gable wall 14 of the hollow shaft 11, from which the partition wall 19 extends through the open gable end of the hollow shaft 11 to a filtrate outlet 23 outside the housing 1. The filtrate channel 21 communicates with a filtrate outlet 24 outside the housing 1. An overflow member 25 is provided at the outlet 24, for maintaining a pool of filtrate in the channel 21. The overflow member 25 is arranged, such that the surface level of the pool of filtrate in the channel 21 is below said upper wall edges of the partition wall 19. (As an alternative, the overflow member 25 may be eliminated.)

Each side wall 6, 7 of each filter disc 5 is provided with a plurality of circumferentially spaced filtrate guide members 26 extending radially within the hollow filter disc 5 from the radially outer end to the radially inner end of the filter disc 5, for guiding filtrate to the filtrate chamber 12. The guide members 26 have a L-shaped cross-section to form channels for filtrate (FIG. 3). As an alternative, each filter disc 5 may be provided with guide members 27 having a substantially U-shaped cross-section, to form channels for filtrate (FIG. 4).

The course fraction outlet member 3 is provided with an adjustable overflow member 28.

In operation, the hollow shaft 11 and the filter discs 5 are rotated by the drive motor 13 in counter-clockwise direction, as shown in FIG. 1. The liquid to be filtered, such as white water, is pumped into the housing 1 via the inlet member 2 by the pump 4, so that the interior of the housing 1 outside the filter disc 5 is completely filled with white water. Filtrate is forced through the filter material 9 of the discs 5 into the interior of the discs 5, while a course fraction of the white water containing up to about 3% fibres is discharged through the outlet member 3. The overflow member 28 is adjusted, such that a desired pressure difference between the outside and the inside of the filter discs 5 is maintained.

Mats of fibres are built up on the outside of the filter material 9 of the discs 5 during rotation of the discs 5. These mats are pushed off and disintegrated into clumps of fibres by high pressure jets of cleansing liquid from the spray nozzles 18 at the top of the filter discs 5. The filtrate which passes through the filter material which has just been cleansed constitutes a cloudy fraction of the filtrate, i.e. a fraction of the filtrate containing small fibres. The cloudy fraction is guided by the guide members 26 into the filtrate channel 20.

New mats of fibres are quickly built up on the filter material during the further rotation of the filter discs 5. Such a mat of fibres constitutes in itself a filter medium, which prevents smaller fibres from passing into the filter discs 5. Thus, during the main part of the revolution of the filter discs 5, a clear fraction of the filtrate passes through the filter material into the filtrate channel 21. The cloudy filtrate discharged through the outlet 23 is normally fed back into the white water to be filtered. The clear filtrate is discharged through the outlet 24.

The filtering apparatus shown in FIGS. 5 to 7 comprises a container 29 with an inlet 30 for the liquid to be filtered at one side of the container 29, and an outlet 31 for a created course fraction, at the opposite side of the container 29. A hollow shaft 32 with a circular cylindrical wall 33 extends horizontally in the container 29 and is journalled on the latter. A drive motor 34 at one end of the shaft 32 is arranged to rotate the shaft 32.

Three hollow annular filter discs 35 are vertically mounted on the shaft 32. The discs 35 are spaced from each other and situated concentric with the shaft 32. Each filter disc 35 comprises twenty-four guide members 36, a peripheral wall 37, and two opposed liquid pervious side walls 38 covered with filter material. The guide members 36 extend from the hollow shaft 32 backward in the direction of rotation of the filter discs 35 dividing the interior of each filter disc 35 into twenty-four filtrate chambers 39 located in series around the filter disc 35. The chambers 39 communicate with the interior of the hollow shaft 32 via holes 40, respectively, in the cylindrical wall 33. Opposite the drive motor 34, the hollow shaft 32 has an open end, at which the cylindrical wall 33 is sealingly journalled on the wall of the container 29.

A stationary pipe 41 for cleansing fluid extends above the container 29 in parallel with the hollow shaft 32. From the pipe 41 four radial branch pipes 42 extend downward along the side walls 38 of the filter discs 35. Each branch pipe 42 is provided with a number of spray nozzles 43.

A stationary rigid partition wall 44 extends axially in the interior of the hollow shaft 32 and divides the latter into three axial filtrate channels 45, 46 and 47, which are partly defined by the cylindrical wall 33. The partition wall 44 forms a double-trough with three upper axial wall edges, each of which is spaced a distance S from the cylindrical wall 33 (FIG. 7). The upper wall edges of the partition wall 44 are located, such that filtrate channel 45 receives cloudy filtrate from upper filtrate chambers 39, which are between one o'clock and ten o'clock positions at the filter discs 35, filtrate channel 46 receives clear filtrate from lower filtrate chambers 39, which are between ten o'clock and three o'clock positions at the filter discs 35, and filtrate channel 47 receives ultra-clear filtrate from up-moving filtrate chambers 39, which are between three o'clock and one o'clock positions at the filter discs 35, as seen in FIG. 5. The filtrate channels 45 and 46 communicate with outlets 48 and 49, respectively, located outside the container 1. Filtrate channel 47 communicates with an outlet, which is not shown in the drawings.

In operation the liquid to be filtered is supplied to the container 29 via the inlet 30. The volume of the body of liquid in the container 29 is controlled by an adjustable overflow member 50 at the outlet 31 and a pool of filtrate is maintained in the filtrate channel 46 by an overflow member 51 at the outlet 49, so that a desired hydrostatic pressure difference is maintained between the body of liquid in the container 29 and the pool of filtrate in the filtrate channel 46. Course particles are entrained by entrainments members 52 on the peripheral walls 37 of the discs 35 toward the overflow member 50.

A created course fraction of the liquid is discharged through the outlet 31 via the overflow member 50. With respect to the creation of filtrate fractions, the apparatus shown in FIGS. 5 to 7 operates similarly to the apparatus described in connection with FIGS. 1 and 2, except that the former includes a third filtrate channel 47 for receiving an ultra-clear filtrate.

The filtering apparatus shown in FIGS. 8 to 11 comprises a container 53, an inlet 54, a hollow shaft with a circular cylindrical wall 55, hollow filter discs 56, twelve guide members 57 in each filter disc 56 dividing the interior of the filter disc 56 into twelve filtrate chambers 58, outlets 59 in the cylindrical wall 55, and a stationary partition wall 60, all the above mentioned components located in like manner to the analogous components described in connection with the apparatus shown in FIGS. 5 to 7. The difference between the apparatus shown in FIGS. 8 to 11 and the apparatus described-above in connection with FIGS. 5 to 7 principally lie in the design of the filtrate chambers 58, the partition wall 60, and the manner in which the created course fraction is discharged from the apparatus.

Each guide member 57 is bent forward in the direction of rotation of the filter discs 56 to form two straight wall portions, one radially inner wall portion 61a and one radially outer wall portion 61b. The outer wall portion 61b is at an angle to the inner wall portion 61a. (As an alternative, each guide member 57 may be steplessly curved forward in the direction of rotation). The partition wall 60 has three wall extensions 61, 62 and 63 which divide the interior of the hollow shaft into three filtrate channels 64, 65 and 66 numbered in the direction of rotation of the filter discs 56. The free ends of the wall extensions 62 and 63 are located at eight o'clock and five o'clock positions, respectively, in relationship to the filter discs 56, as seen in FIG. 8.

Three overflow members (not shown) maintain a pool of cloudy filtrate fraction in channel 64, a pool of clear filtrate fraction in channel 65, and a pool of ultra-clear filtrate fraction in channel 66. Said pools of filtrate are kept at different levels, such that the head of the filtrate in channel 66 is higher than the head of the filtrate in channel 65, and the latter is higher than the head of the filtrate in channel 64. Thus, filtrate cannot leak between the channels 64, 65 and 66 in the direction of rotation of the discs 56.

Figure 11:
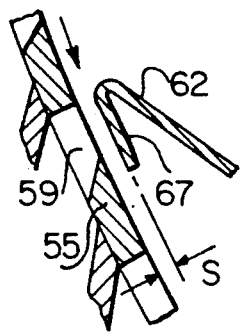
FIG. 11 is an enlarged detail of the embodiment shown in FIG. 8.

The wall extension 62 is provided with an end portion 67, which has a length in the circumferential direction which is longer than that of each outlet 59 of the filter discs 56, for maintaining a distance S between the wall extension 62 and the cylindrical wall 55 during rotation of the discs 56 (FIG. 11). The wall extension 63 is also provided with such an end portion.

Figure 12:
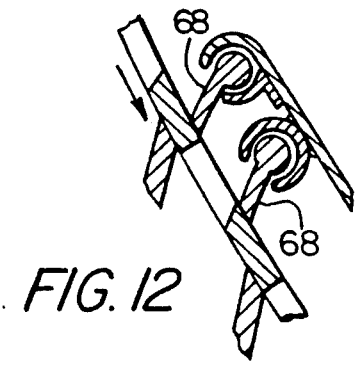
FIG. 12 is a modification of the embodiment shown in FIG. 11.

As illustrated in FIG. 12, each wall extension 62, 63 may alternatively be provided with a pair of axial sealing members 68, which are yieldable in the direction of rotation, for preventing too much filtrate to flow between the filtrate channels 64 to 66.

When operating the apparatus of FIGS. 8 to 12 for filtering white water, a porous mat of fibres is created on the filter material of a chamber 58, as the chamber 58 moves down into the white water in the container 53. The mat becomes thicker and more water impervious during the further displacement of the chamber 58 through the white water. As the chamber 58 is in the two o'clock position noted by the reference numeral A in FIG. 8, the chamber 58 has raised its content of filtrate substantially up above the surface level of the white water in the container 53, while the outlet 59 of the chamber 58 opens into the pool of filtrate in the filtrate channel 66, so that a negative pressure corresponding to the head H of the operating filtrate column in the chamber 58 is created in the chamber 58. Said negative pressure dewaters the mat of fibres located above the white water to the extent, that the filter material of the chamber 58 are covered with coherent cakes of fibres.

Such cakes of fibres do not disintegrate when they are removed from the chambers 58, which can give rise to clogging and stoppage of the apparatus. Therefore, vertical chutes 69 are arranged at the sides of the filter disc 56 at the down-moving parts of the filter discs 56 for receiving loosened cakes. The chutes 69 are united by a horizontal screw conveyor 70 for conveying the cakes to a common discharge pipe 71.

Spray nozzles 72 are arranged at the radially outer ends of the filter discs 56 above the chutes 69 for directing high pressure jets of water against the joints between the fibre cakes and the side walls of filter material for rolling off the cakes, so that the cakes drop into the chutes 69. There are also spray nozzles 73 for cleansing the filter material before the latter moves down into the suspension.

The desired surface level of the suspension in the container 56 is maintained by controlling the rotational speed of the filter discs 56.

I claim:

1. An apparatus for filtering liquids, such as fiber pulp suspensions, comprising:
   at least one annular hollow filter disc with side walls covered with filter material adapted to be at least partly immersed in a body of a liquid to be filtered and arranged substantially transverse to a horizontal axis extending centrally through the filter disc;

means for rotating the annular hollow disc about the horizontal axis;

shaft wall means connected to the filter disc and forming a circular cylindrical chamber, which extends centrally through the hollow filter disc coaxial with the axis and which communicates with the interior of the hollow filter disc;

means for creating a pressure difference between the body of liquid to be filtered and the interior of the hollow filter disc, such that a filtrate of the liquid is forced through the filter material into the hollow filter disc and passed therefrom into the cylindrical chamber;

spray nozzle means for cleaning the filter material;

rigid stationary partition wall means extending axially in the cylindrical chamber and dividing the latter into at least first and second adjacent axial channels, which are partly defined by the shaft wall means, wherein during operation, the second axial channel of the first and second adjacent axial channels, as seen in the direction of rotation of the filter disc, receives a purer filtrate fraction than that of the first axial channel of the two adjacent channels;

the partition wall means being radially spaced from the shaft wall means and arranged, such that all of the axial channels receive various fractions of filtrate, respectively, during operation;

filtrate discharge means adapted to discharge the fractions of filtrate separately from the respective axial channels, such that the pressure prevailing in the filtrate of each channel is at least substantially as high as atmospheric pressure;

the filtrate discharge means being adapted to maintain the axial channels at least partly filled with air; and pressure control means for keeping the pressure in the purer filtrate fraction in the second channel somewhat higher than the pressure in the less pure filtrate fraction in the first channel, where communication between the adjacent channels takes place.

2. An apparatus according to claim 1, wherein the hollow filter disc is provided with a plurality of circumferentially spaced filtrate guide members extending within the hollow filter disc along the side walls, for quiding filtrate to the cylindrical chamber.

3. An apparatus according to claim 2, wherein the guide members extend between the side walls and are positioned so as to divide the interior of the filter disc into a number of filtrate chambers disposed in series around the filter disc, and the filtrate chambers communicate with the cylindrical chamber via outlets, respectively, formed by the shaft wall means.

4. An apparatus according to claim 3, further comprising a container for the liquid to be filtered, the container enclosing the filter disc, and means for controlling the volume of the liquid in the container during operation, such that the side walls are partly above the liquid in the container.

5. An apparatus according to claim 4, wherein the filtrate discharge means comprises means for maintaining a pool of filtrate in at least one of the axial channels, and the guide members are arranged, such that each filtrate chamber is at least partly above the pool of filtrate at some point of the revolution of the filter disc at the up-moving part of the filter disc, while the outlet of the filtrate chamber opens into the pool of filtrate.

6. An apparatus according to claim 5, wherein the guide members are arranged, such that each filtrate chamber is at least partly above the liquid in the container at some point of the revolution of the filter disc at the up-moving part of the filter disc, while the outlet of the filtrate chamber opens into the pool of filtrate.

7. An apparatus for filtering liquids, such as fiber pulp suspensions, comprising:

at least one annular hollow filter disc with side walls covered with filter material adapted to be at least partly immersed in a body of a liquid to be filtered and arranged substantially transverse to a horizontal axis extending centrally through the filter disc;

means for rotating the annular hollow disc about the horizontal axis;

shaft wall means connected to the filter disc and forming a circular cylindrical chamber, which extends centrally through the hollow filter disc coaxial with the axis and which communicates with the interior of the hollow filter disc;

means for creating a pressure difference between the body of liquid to be filtered and the interior of the hollow filter disc, such that a filtrate of the liquid is forced through the filter material into the hollow filter disc and passed therefrom into the cylindrical chamber;

spray nozzle means for cleaning the filter material;

rigid stationary partition wall means extending axially in the cylindrical chamber and dividing the latter into at least two axial channels, which are partly defined by the shaft wall means;

the partition wall means being radially spaced from the shaft wall means and arranged, such that all of the axial channels receive various fractions of filtrate, respectively, during operation; and filtrate discharge means adapted to discharge the fractions of filtrate separately from the respective axial channels, such that the pressure prevailing in the filtrate of each channel is at least substantially as high as atmospheric pressure.

8. An apparatus according to claim 7, wherein the filtrate discharge means is adapted to maintain the axial channels at least partly filled with air.

* * * * *